United States Patent
Dorneich et al.

(10) Patent No.: US 8,977,407 B2
(45) Date of Patent: Mar. 10, 2015

(54) ADAPTIVE USER INTERFACE FOR SEMI-AUTOMATIC OPERATION

(75) Inventors: Michael Christian Dorneich, Saint Paul, MN (US); Stephen Whitlow, St. Louis Park, MN (US); William Rogers, Minneapolis, MN (US); Karen Feigh, Atlanta, GA (US); Robert E. De Mers, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 755 days.

(21) Appl. No.: 12/473,114

(22) Filed: May 27, 2009

(65) Prior Publication Data

US 2010/0305778 A1 Dec. 2, 2010

(51) Int. Cl.
*G05D 1/00* (2006.01)
*B64C 39/02* (2006.01)

(52) U.S. Cl.
CPC ............ *G05D 1/0038* (2013.01); *G05D 1/0044* (2013.01); *B64C 39/024* (2013.01); *B64C 2201/146* (2013.01)
USPC .......... 701/2; 701/3; 701/23; 701/24; 701/28; 701/400; 701/408; 701/412; 701/418; 701/439; 348/113; 348/114; 348/115; 348/116; 348/117; 348/118; 348/119; 348/120; 348/143; 348/144; 348/211.99

(58) Field of Classification Search
CPC ..... G05D 1/00; G05D 1/0011; G05D 1/0044; G05D 1/0055; G05D 1/0061; G05D 1/0246; G05D 2201/0207; G05D 2201/0209; G05D 2201/0213; G06G 1/00; G06G 1/005; G06G 1/0052; G08G 5/0047; G08G 5/0069; G01C 21/00
USPC ............ 701/2, 3, 23, 24, 28, 200, 207, 213, 701/400, 408, 412, 418, 439; 348/113–120, 348/143, 144, 211.99
See application file for complete search history.

(56) References Cited

U.S. PATENT DOCUMENTS

| | | | | |
|---|---|---|---|---|
| 5,263,396 | A | * | 11/1993 | Ladan et al. .................. 89/1.11 |
| 5,448,479 | A | * | 9/1995 | Kemner et al. ................. 701/23 |
| 6,108,031 | A | * | 8/2000 | King et al. ..................... 348/118 |
| 6,633,800 | B1 | * | 10/2003 | Ward et al. ....................... 701/2 |
| 6,908,066 | B2 | * | 6/2005 | Koenig ..................... 246/122 A |

(Continued)

OTHER PUBLICATIONS

Vasseur, L. et al.; Constrained Navigation for Unmanned Systems; Thales Land & Joint Systems, B.P. 55, Rue Guynemer; France.

(Continued)

*Primary Examiner* — Jack W Keith
*Assistant Examiner* — Chuong P Nguyen
(74) *Attorney, Agent, or Firm* — Ingrassia Fisher & Lorenz, P.C.

(57) ABSTRACT

A method is provided for semi-automatic operation of a portable control device for a remote-controlled, unmanned vehicle. The method includes the steps of monitoring parameters of an operational environment of the portable control device, switching from a manual operation mode to a semi-automatic operation mode in response to occurrence of predetermined criteria within the operational environment, and presenting a semi-automatic operation graphical user interface to a user of the portable control device. The semi-automatic operation graphical user interface includes a reduced set of user interfaces for the semi-automatic operation mode presented by the portable control device.

20 Claims, 5 Drawing Sheets

(56) References Cited

U.S. PATENT DOCUMENTS

| | | | |
|---|---|---|---|
| 8,011,615 B2* | 9/2011 | Silansky et al. | 244/30 |
| 2002/0022909 A1* | 2/2002 | Karem | 701/3 |
| 2006/0089800 A1* | 4/2006 | Svendsen et al. | 701/301 |
| 2007/0198159 A1* | 8/2007 | Durkos et al. | 701/50 |
| 2007/0276552 A1* | 11/2007 | Rodocker et al. | 701/2 |
| 2007/0283871 A1* | 12/2007 | Millum et al. | 114/331 |
| 2008/0121097 A1* | 5/2008 | Rudakevych et al. | 89/28.05 |
| 2008/0195269 A1* | 8/2008 | Lacy et al. | 701/24 |
| 2008/0269964 A1* | 10/2008 | Majka | 701/7 |
| 2009/0234499 A1* | 9/2009 | Nielsen et al. | 700/250 |
| 2010/0084513 A1* | 4/2010 | Gariepy et al. | 244/190 |
| 2010/0106344 A1* | 4/2010 | Edwards et al. | 701/2 |
| 2010/0118147 A1* | 5/2010 | Dorneich et al. | 348/155 |
| 2010/0176914 A1* | 7/2010 | Moraes | 340/3.1 |
| 2010/0228418 A1* | 9/2010 | Whitlow et al. | 701/25 |

OTHER PUBLICATIONS

Tso, K. et al.; A Multi-Agent Operator Interface for Unmanned Aerial Vehicles; IA Tech, Inc.; Los Angeles, CA.

Rohde, M.M. et al.; PointCom: Semi-Autonomous UGV Control with Intuitive Interface; Proc. of SPIE vol. 6962 69620G-1.

EP Search Report, EP 10162877.4-2206/2256571 dated Nov. 25, 2011.

EP Communication, EP 10162877.4-2206 dated Dec. 9, 2011.

Israeli Office Action for application No. 205824 dated Dec. 18, 2013.

* cited by examiner

ADAPTIVE USER INTERFACE FOR SEMI-AUTOMATIC OPERATION

FIELD OF THE INVENTION

The present invention generally relates to adaptive user interfaces, and more particularly relates to a method and apparatus for automatically adapting user interfaces for streamlined user input supported by semi-automatic operation.

BACKGROUND OF THE INVENTION

Unmanned, remote-controlled vehicles are unmanned air, ground or other vehicles which provide specific functions at locations remote from a surveillance vehicle operator or controller, such as surveillance or reconnaissance, transportation of detectors or devices (e.g., weapons), and/or functioning as a decoy. Some unmanned vehicles, such as micro air surveillance vehicles, are designed to be small in size to allow portability and, when performing surveillance, to provide reconnaissance in a limited area close to the operator or controller. For example, in a military setting, an unmanned vehicle could be used to provide video reconnaissance for a military group, transport weapons, or function as a decoy. The operation of the unmanned vehicle is remotely controlled by an operator using a portable control unit and traveling with the military group. Manual operation of both the unmanned vehicle's operation and, if applicable, the video signals received therefrom can be controlled by a fully-engaged operator, requiring both attention and dexterity. For instance, to steer the unmanned vehicle, the operator is required to input commands via user interfaces to control movement in one or more linear or angular dimensions. When the military group is on the move, such levels of operator attention and dexterity is difficult to maintain. For example, the operator may be moving or may have to multi-task operation of the unmanned vehicle with other tasks and/or duties, dividing his attention between the portable control unit and the outside world.

Most unmanned vehicles have a travel plan uploaded to the vehicle and, thereafter, operate automatically in accordance with the plan and/or operate manually in accordance with manual commands inputted by the operator via the user interfaces. Accordingly, automatic operation typically requires the surveillance vehicle to travel to a specified location and/or altitude in accordance with the travel plan. Such automatic operation, however, may render the video information provided by the unmanned vehicle less usable for reconnaissance because changing conditions may change the locations, persons, or devices to be observed. Accordingly, manual operation may be required to assure high valued results. Yet, as described hereinabove, manual operation is difficult in many situations.

Thus, what is needed is a semi-automatic operation mode for the air unmanned vehicle to provide a reduced set of user input requirements and a reduced set of information displayed and a method and apparatus for automatically adapting user interfaces for the semi-automatic operation in response to an occurrence of changes in various parameters within an operational environment. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for semi-automatic operation of a portable control device for a remote-controlled unmanned vehicle. The method includes the steps of monitoring parameters of an operational environment of the portable control device, switching from a manual operation mode to a semi-automatic operation mode in response to measured and weighted combination of detected inputs and the monitored parameters within the operational environment, and, while in the semi-automatic operation mode, presenting a semi-automatic operation graphical user interface to a user of the portable control device. The semi-automatic operation graphical user interface includes a reduced set of user input requirements and a reduced set of information displayed for the semi-automatic operation mode presented by the portable control device.

In addition, a portable control device is provided for remotely controlling a unmanned vehicle. The portable control device includes a graphic user interface (GUI) and a controller. The GUI presents information thereon to a user of the portable control device and receives user inputs thereby. The controller is coupled to the GUI and controls the operational mode of the portable control device. The controller switches from a manual operation mode to a semi-automatic operation mode in response to a measured and weighted combination of detected inputs and the monitored parameters within the operational environment of the portable control device (including user control of modes) and provides GUI operational signals to the GUI device for presenting a semi-automatic operation graphical user interface to the user while in the semi-automatic operation mode, the semi-automatic operation graphical user interface including a reduced set of user input requirements and a reduced set of information displayed for the semi-automatic operation mode presented by the portable control device.

Further, an unmanned vehicle system is provided which includes a remote-controlled unmanned vehicle and a portable control device. The portable control device is coupled to the unmanned vehicle, providing operational control signals thereto and receiving operational parameter signals and video signals therefrom. The unmanned vehicle includes communication circuitry, a movement control module, an unmanned vehicle controller, and a visual recording module. The communication circuitry of the unmanned vehicle receives operational control signals from the portable control device and transmits operational parameter signals and visual signals to the portable control device. The movement control module controls the movement of the unmanned vehicle in response to movement control signals and generates a first portion of the operational parameter signals in response to operation of the movement control module. The surveillance vehicle controller is coupled to the communication circuitry. In addition, the surveillance vehicle controller is coupled to the movement control module and generates the movement control signals in response to a first portion of the operational control signals. The visual recording module records visual signals representative of one or more views from the unmanned vehicle in response to visual control signals and generates a second portion of the operational parameter signals in response to operation of the visual recording module. The unmanned vehicle controller is also coupled to the visual recording module and generates the visual control signals in response to a second portion of the operational control signals. The portable control device includes communication circuitry, a graphic user interface (GUI), and a portable control device controller. The communication circuitry of the portable control device receives the operational parameter signals and the visual signals from the unmanned vehicle and transmits the operational control signals. The GUI presents visual information to a user of the portable control device and receives user inputs thereby. The portable control device controller is coupled to the GUI and controls the operational mode of the portable control device. The portable control device controller monitors an operational environment of the portable control device and switches from a manual operation mode to a semi-automatic operation mode in response to a measured and weighted combination of detected inputs and monitored parameters within the operational environment of the portable control device, the controller providing GUI operational signals to the GUI for presenting a semi-automatic operation graphical user interface to the user while in the semi-automatic operation mode, the semi-automatic operation graphical user interface including a reduced set of user interfaces for the semi-automatic operation mode presented by the portable control device.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
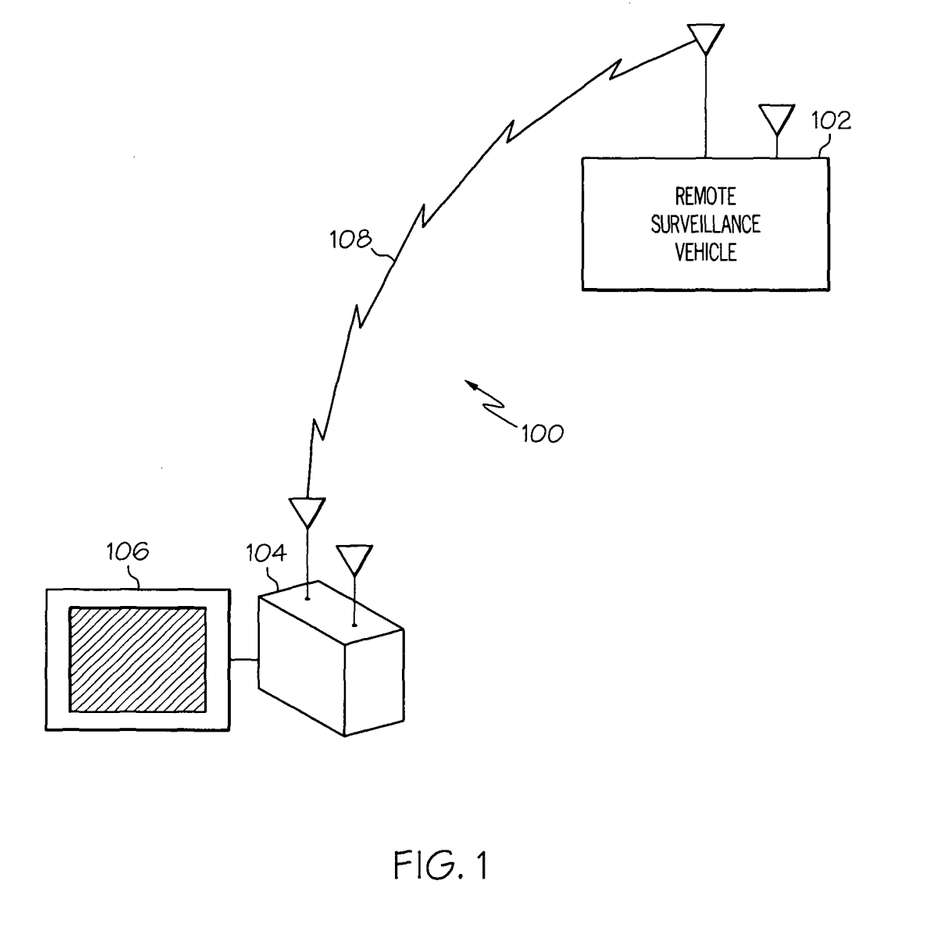
FIG. 1 illustrates an unmanned vehicle system including an unmanned vehicle and a portable control device in accordance with an embodiment of the present invention.

Referring to FIG. 1, an unmanned vehicle system 100 in accordance with an embodiment of the present invention includes a remote unmanned vehicle 102 coupled to a portable control device 104. The unmanned vehicle 102 could be an air surveillance vehicle, such as a portable micro air surveillance vehicle with flight capability, or an unmanned ground surveillance vehicle capable of movement across terrain. Whether the unmanned vehicle 102 is an air or ground vehicle, it can be assigned functions other than or in addition to remote reconnaissance, such as payload delivery. The portable control device 104 is wirelessly coupled to the remote unmanned surveillance vehicle 102 via a radio frequency (RF) wireless link 108 for providing operational control signals thereto for control of the operation of the unmanned vehicle 102. A user or operator of the portable control device 104 enters control commands on a graphic user interface 106 for operation of the unmanned vehicle 102 and control of the surveillance information recorded by the unmanned vehicle 102. While the unmanned vehicle system 100 of FIG. 1 depicts the RF wireless connection 108 between the unmanned vehicle 102 and the portable control device 104, the connection could also be a wired connection or a non-RF wireless connection.

Figure 2:
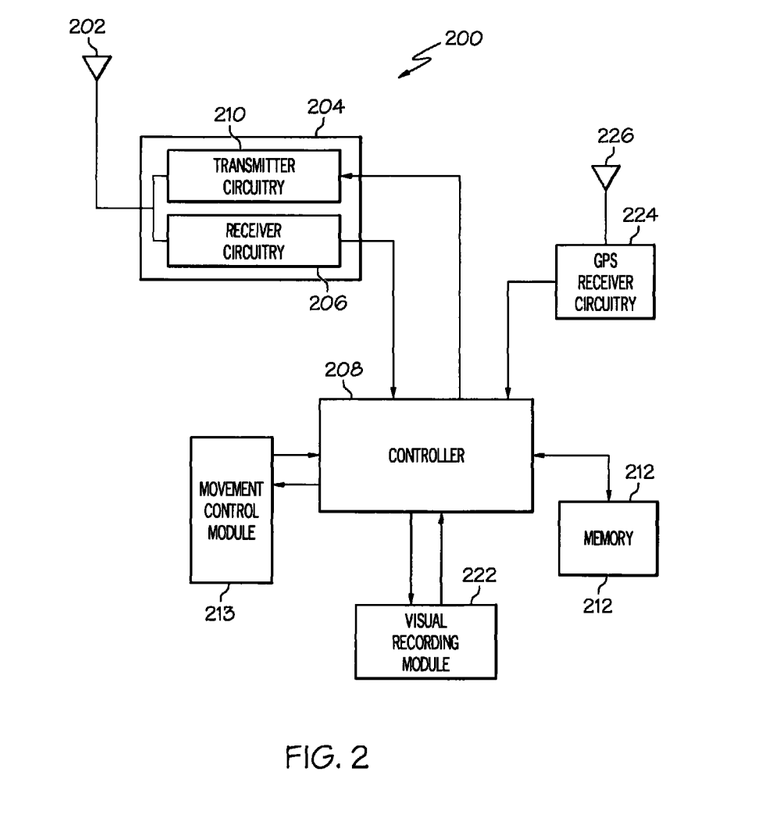
FIG. 2 is a block diagram illustrating an unmanned vehicle of the system of FIG. 1 in accordance with the present embodiment.

Referring next to FIG. 2, a block diagram 200 depicts basic components of the unmanned vehicle 102 in accordance with the present embodiment. The unmanned vehicle 102 includes an antenna 202 for receiving radio frequency (RF) signals from and transmitting RF signals to the portable control device 104. The antenna 202 is coupled to communication circuitry 204. The communication circuitry 204 includes receiver circuitry 206 for demodulating and decoding the RF signals to recover operational control signals therefrom and is coupled to a surveillance vehicle controller 208 for providing the operational control signals thereto. The communication circuitry 204 also includes transmitter circuitry 210 for receiving information from the controller 208 and generating RF signals in response thereto by encoding the information and modulating the encoded information onto RF waves within RF channels utilized for the wireless link with the portable control device 104.

The unmanned vehicle 102 also includes a nonvolatile memory 212 coupled to the controller 208 and storing information for operation of the unmanned vehicle 102 in accordance with the preferred embodiment. The unmanned vehicle 102 also includes a movement control module 213 for control of the direction of travel of the unmanned vehicle 102 as well as monitoring its operational conditions to generate a first portion of operational parameter signals in response to operation of the movement control module 213.

A visual recording module 222, such as one or more remotely controllable electro-optical or infrared digital still or video cameras, performs the surveillance function for the unmanned vehicle 102 and operates in response to visual device control signals from the controller 208. The visual device control signals control, for example, the focus, the zoom, the pitch and the direction of devices within the visual recording module 222 as it records visual signals representative of one or more views from the unmanned vehicle 102.

The movement control module 213 operates in response to movement control signals from the controller 208 and provides the first portion of the operational parameter signals to the controller 208. The visual recording module 222 provides the visual signals and a second portion of the operational parameter signals to the controller 208, the second portion of the operational parameter signals generated by the visual recording module 222 in response to the operation of video recording devices (e.g., cameras) therein. The controller 208 generates the movement control signals and the visual device control signals in response to the operational control signals received thereby. In addition, the controller 208 provides the operational parameter signals and the visual signals to the transmitter circuitry 210 for forwarding to the portable control unit 104, the operational parameter signals utilized by the portable control unit 104 operator to monitor the operation of the components of the unmanned vehicle 102.

Global Positioning System (GPS) receiver circuitry 224 receives GPS signals via an antenna 226 tuned to a GPS signaling channel and generates location signals corresponding to a location of the unmanned vehicle 102 in response to the GPS signals received thereby, the GPS receiver circuitry being coupled to the controller 208 for providing the location signals thereto. The controller 208 provides the location signals as a portion of the operational parameter signals to the transmitter circuitry 210 for transmission to the portable control unit 104. While GPS receiver circuitry 224 is depicted in FIG. 2 for deriving the location signals, the present invention is not limited to GPS-derived location signals as location information derived from any source would serve the same function in accordance with the present embodiment.

In addition to functioning in accordance with the operational signals received by the controller 208, the controller 208 also generates movement control signals for autonomous operation of the unmanned vehicle 102. For example, functions such as takeoff and landing of an air surveillance vehicle may be autonomously controlled in accordance with operational control signals generated by the controller 208 in accordance with instructions stored in the controller 208 and/or the memory 212. Detection of obstacles such as buildings or hills and obstacle avoidance are also autonomous operations which are handled by the controller 208 and other circuitry of the unmanned vehicle 102. Also, when the surveillance system 100 switches to an automatic operation mode, the controller 208 assumes autonomous control of the movement and visual recording for the unmanned vehicle 102. Further, when the surveillance system 100 switches to a semi-automatic operation mode in accordance with the present embodiment, the controller 208 assumes autonomous control of some of the movement and visual recording functions for the micro air surveillance vehicle 102 as described hereinbelow. While several components of an exemplary unmanned vehicle 102 are depicted in FIG. 2 and described herein, those skilled in the art will realize that any number of additional components could be incorporated within the unmanned vehicle 102 to provide additional capability and functionality therefor.

Figure 3:
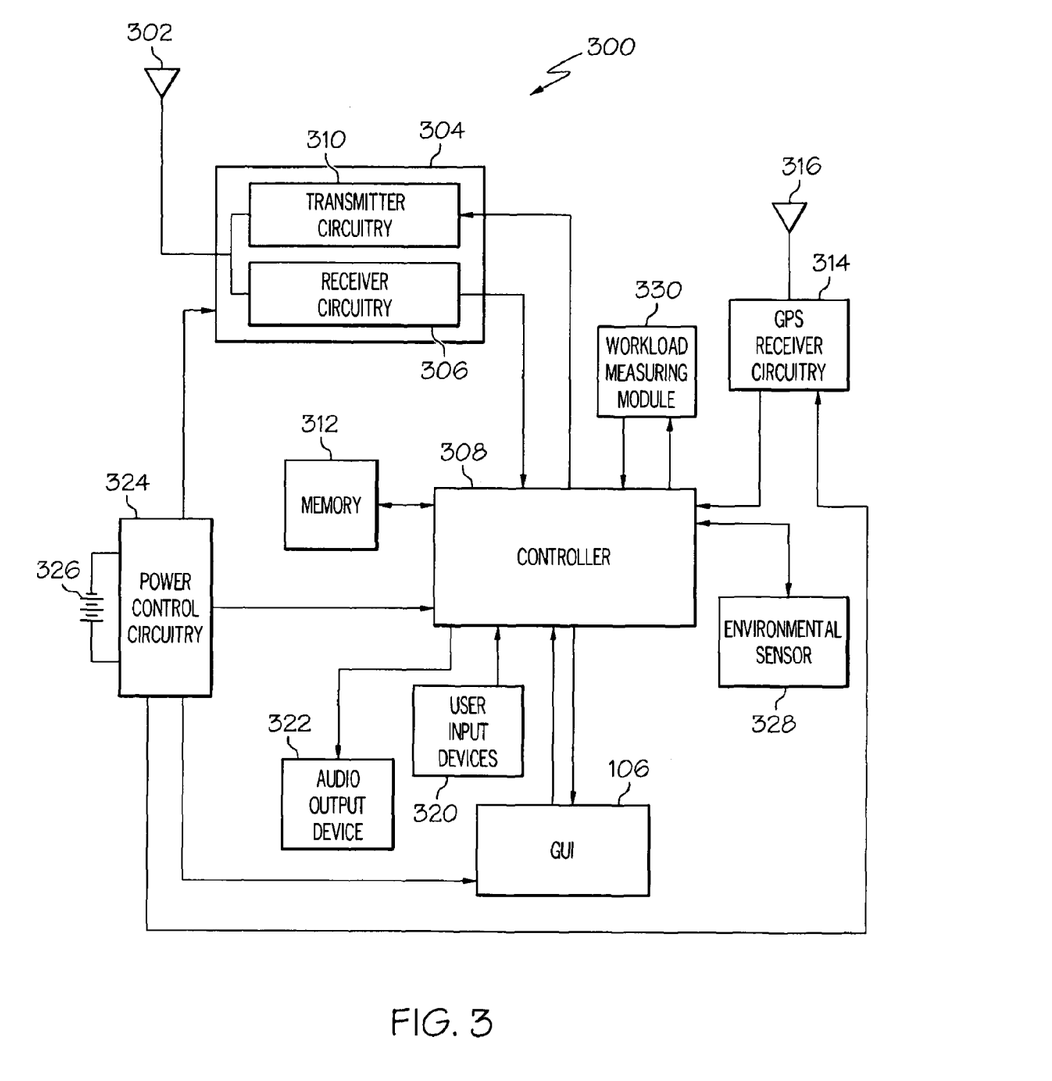
FIG. 3 is a block diagram illustrating a portable control device for the unmanned vehicle of FIG. 2 in accordance with the present embodiment.

Referring to FIG. 3, a block diagram 300 depicts basic components of the portable control unit 104 in accordance with the present embodiment. The portable control unit 104 includes an antenna 302 for receiving the RF signals from and transmitting the RF signals to the unmanned vehicle 102. The antenna 302 is coupled to communication circuitry 304. The communication circuitry 304 includes receiver circuitry 306 for demodulating and decoding the RF signals to recover operational parameter signals and visual signals therefrom and is coupled to a portable control unit controller 308 for providing the operational parameter signals and the visual signals thereto. The communication circuitry 304 also includes transmitter circuitry 310 for receiving operational control signals from the controller 308 and generating RF signals in response thereto for transmission across the wireless link to the unmanned vehicle 102.

The portable control unit 104 also includes a nonvolatile memory 312 coupled to the controller 308 and storing information for operation of the portable control unit 104 in accordance with the preferred embodiment. The nonvolatile memory 312 also includes sufficient memory capacity for storing the visual signals received from the micro air surveillance vehicle 102. Global Positioning System (GPS) receiver circuitry 314 receives GPS signals via an antenna 316 tuned to the GPS signaling channel and generates location signals corresponding to a location of the portable control unit 104 in response to the GPS signals received thereby, the GPS receiver circuitry 314 being coupled to the controller 308 for providing the location signals thereto.

In accordance with the present embodiment, the graphic user interface (GUI) 106 presents visual information including user interfaces to an operator or user of the portable control unit 104 and for providing information thereto and receiving user inputs thereby. The visual information displayed by the GUI 106 presents one or more user input devices, a graphical map view depicting a location of the unmanned vehicle 102 and its predetermined movement path, and a display of the visual signals received from the unmanned vehicle 102. In accordance with the present embodiment, a semi-automatic graphical user interface is generated in response to a measured and weighted combination of detected inputs and monitored parameters within the operational environment of the portable control unit 104 and is presented by the GUI 106. The semi-automatic graphical user interface is a decluttered graphical user interface including a reduced set of controls and information which includes a reduced set of user input devices including low dexterity input devices and limited action input devices, a graphical map view depicting at least a location of the unmanned vehicle 102, and a visual feed view generated from visual signals received from the unmanned vehicle 102.

In addition to the graphic user interface 106, the portable control unit 104 may include other user input devices 320 such as a power control switch or other devoted switches or buttons and other user sensible output devices 322 such as an audio output device for sounding alerts. Power control circuitry 324 receives power control signals from the controller 308 and, in response thereto, provides power from a battery 326 to components of the portable control unit 104 such as the transceiver circuitry 304, the controller 308 the graphical user interface 106, and the GPS receiver circuitry 314. Also, an environmental sensor 328 generates a signal in response to detecting environmental changes within the operational environment of the portable control unit 104 and provides the movement signal to the controller 308. The environmental changes include environmental changes such as recognition of gunshots or detection of an increase or decrease in noise level within the operational environment, movement of the portable control unit, or a change in a body position of an operator of the portable control unit.

The controller 308 also includes a workload measuring module 330 which monitors user activity on the graphical user interface 106 as a function of time. While manual operation of both the unmanned vehicle 102 operation and the visual signals received therefrom can be controlled by a single operator, the operator should be fully-engaged as manual operation of the portable control unit requires both attention and dexterity for manual flight planning and control as well as display and storage of the visual signals. The operator is responsible for management of vehicle movement, video feed management and communication functions, including monitoring of operational parameters and responding to changes in the operational environment. While the operator can prepare a movement plan in advance and upload a predetermined path to the unmanned vehicle 102, manual intervention is typically required in response to the nature and quality of the visual signals received from the unmanned vehicle 102 and obstacles or features in the uploaded path. Further, the operator is expected to interpret the surveillance information for reconnaissance and communicate the interpretations to others. Therefore, in accordance with the present embodiment, the workload measuring module 330 monitors user operation of the portable control device 104 and generates a user workload signal in response to detection of a change in user workload (e.g., an increase or decrease in the user workload).

In accordance with the present embodiment, the controller 308 switches from a manual operation mode to a semi-automatic operation mode in response to a measured and weighted combination of detected inputs and the monitored parameters within the operational environment of the surveillance system 100 such as movement of the portable control unit 104 as indicated by the movement signal, user inattention as indicated by the user workload signal, an increase in the user's workload as indicated by the user workload signal, or a user semi-automatic mode input signal via the GUI 106 or the user input devices 320. In other words, the controller 308 includes GUI management functionality which monitors multiple inputs and parameters from the unmanned vehicle 102, the portable control unit 104, the user, and network context information and weights a combination of these detected inputs and monitored parameters to determine when and how to adapt the GUI 10 for the semi-automatic operation mode. The weighted combination may be a predetermined formula or may alter the weighting factors or the combination formula over time in response to a learning algorithm or other contextually-derived learning formula. In addition, the weighted combination may change over time by alterations to the weighting factors or combination formula or both entered manually by the operator. Therefore, when the signal from the environmental sensor 328 indicates that the portable control unit 104 is moving, the GUI management functionality considers this factor in combination with other factors to determine if the operator will require simplified manual control. In addition, the user workload signal may indicate that the operator's attention may not be sufficient for the manual operation mode. Thus, the GUI management functionality of the controller 308 switches to the semi-automatic operation mode in accordance with the present embodiment to provide a decluttered presentation of information and controls on the GUI 106 by presenting a reduced number of control buttons sized for reduced dexterity and having a simplified menu structure for limited action (e.g., one or two touch) input commands as well as resizing graphic information for display on the GUI 106.

Figure 4:
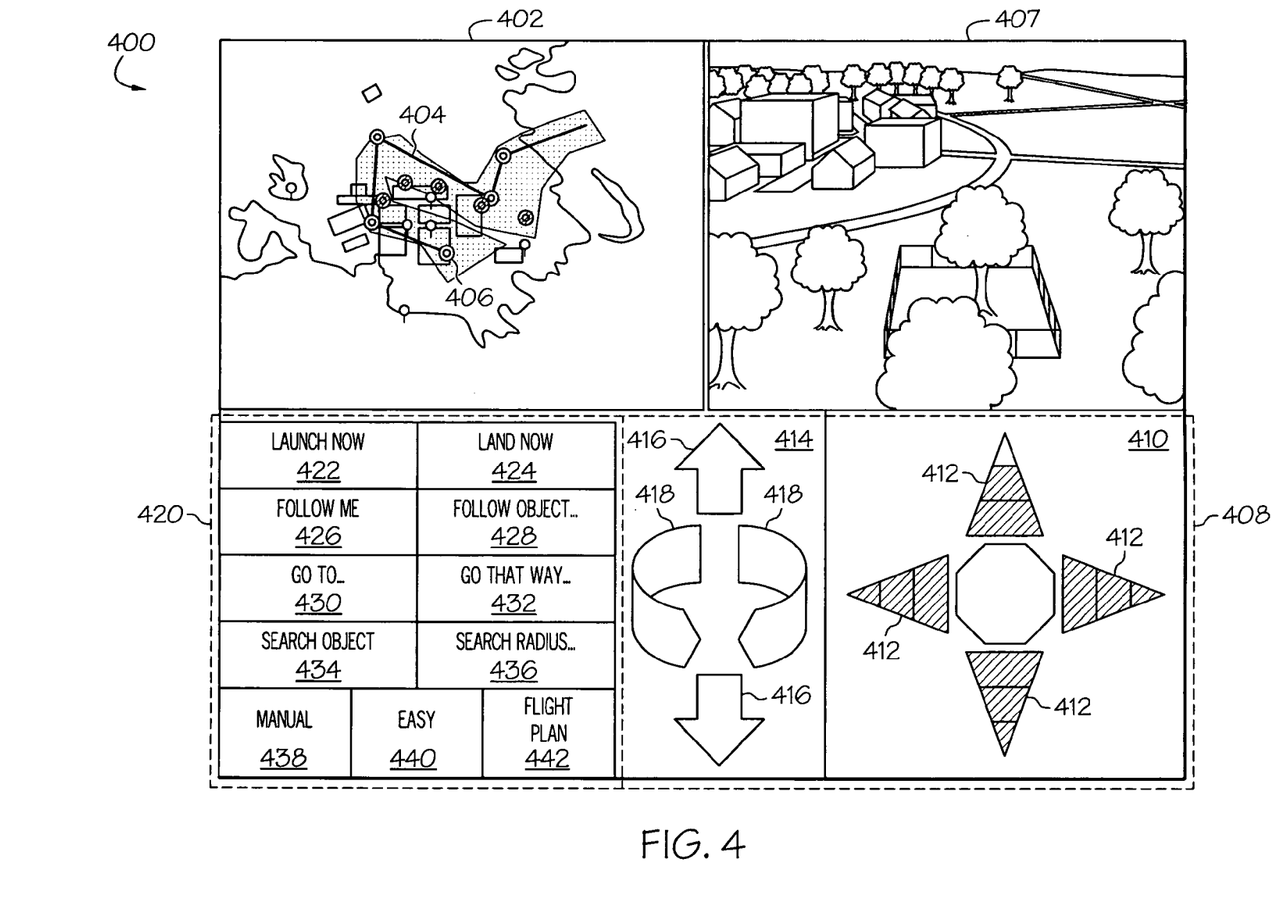
FIG. 4 is a planar view of a semi-automatic operation display on a graphical user interface of the portable control device of FIG. 3 in accordance with the present embodiment.

When switching to the semi-automatic operation mode, the controller 308 provides GUI operational signals to the graphic user interface 106 for displaying a semi-automatic graphical user interface on the GUI 106. FIG. 4 depicts a view 400 of an exemplary semi-automatic graphical user interface in accordance with the present embodiment. The semi-automatic graphical user interface includes a graphical map view 402 depicting a preloaded path 404 for movement of the unmanned vehicle 102 and its present location 406. The graphical map view 402 is annotated with points of interest such as buildings, ground coverage and hills or lakes. Alternatively, the graphical map view could be an aerial photograph with the movement path 404 and the present location 406 overlayed thereon. While a full graphical map view including a multitude of points of interest may be accessible in the full manual mode and, when accessed may cover the entire display of the GUI 106, the graphical map view 402 of the semi-automatic graphical user interface only shows information which supports simplified manual control in accordance with the decluttered view for the semi-automatic operation mode.

Along with the graphical map view 402, the semi-automatic graphical user interface includes a display 407 of the visual signals (e.g., photos or video feed) received from the unmanned vehicle 102. The display 407 could depict a full view of the video feed or could display a partial view of the video signals such as a predetermined portion of the center of the video feed view in order to be easily visible while occupying only a portion of the touchscreen display.

Finally, the semi-automatic graphical user interface includes a user input section 408 incorporating a reduced set of one or more predetermined user input devices displayed on the GUI 106. A first vehicle control section 410 includes linear directional low dexterity input devices 412 displayed for control of the movement of the unmanned vehicle 102, such as directional thrust control. A second vehicle control section 414 includes both vertical up and down control fat finger input devices 416 and left and right angular control fat finger input devices 418 displayed for flight control of the unmanned vehicle 102. The fat finger input devices 412, 414, 416 are large buttons which facilitate input control during low dexterity operational conditions (e.g., while a user is moving). In addition, for simplified movement control, the input devices 412, 414, 416 are provided only for the basic or cardinal directions. If the operator desires more controllability and is able to provide the attention needed for such control, he can switch operation of the portable control unit 104 back to manual operation mode.

A quick command section 420 includes a plurality of quick button input devices 422 displayed on the touchscreen display 318. The quick button input devices are a small number of limited action commands which require only one or two actions to engage and are provided in a low dexterity (e.g., fat finger) format. For example, the LAUNCH NOW quick button input device 422 will trigger an automated sequence in the unmanned vehicle 102 to cause it to takeoff and proceed upon its predetermined path. The LAND NOW quick button input device 424 will trigger an automated sequence in the unmanned vehicle 102 to cause it to land immediately or return to its predetermined landing point and land. And the FOLLOW ME quick button input device 426 will signal the unmanned vehicle 102 to alter its travel path in response to the geo-location signals of the portable control unit so that the unmanned vehicle 102 will follow the user.

While limited action commands of quick button input devices 422, 424, 426 are single action input devices, some limited action commands may require two actions. For example, the FOLLOW OBJECT . . . quick button input device 428 requires a second input on the graphical map view 402 or the visual view 407 to indicate an object to follow, the unmanned vehicle controlling its movement to match movement of the identified object. The GO TO . . . quick button input device 430 requires a second input at a location on the graphical map view 402 to indicate where the unmanned vehicle 102 is instructed to travel. The GO THAT WAY . . . quick button input device 432 requires a second input on, for example, either a directional indicator 412, 416, 418 in the vehicle control sections 410, 414 to indicate a direction in which the unmanned vehicle 102 is instructed to travel, or a location on the graphical map view 402 to indicate a direction in which the unmanned vehicle 102 is instructed to travel. The SEARCH OBJECT quick button input device 434 requires a second input on an object depicted in the graphical view 402 or the visual view 407 to indicate an object about which the user desires more information and the unmanned vehicle will circle and/or focus in on the object identified. And the SEARCH RADIUS quick button input device 436 requires a second input defining an area on the graphical map view to indicate in which the unmanned vehicle 102 is instructed to travel. While specific exemplary quick button input devices and their functionality have been described hereinabove, those skilled in the art will realize that other functionalities can be assigned to the quick button input devices 422, 424, 426, 428, 430, 432, 434, 436 and/or other quick button input devices can be added without departing from the spirit of the present invention.

The bottom three quick button input devices switch the operational mode between MANUAL 438 and EASY 440 (a designation for the semi-automatic operation mode) or FLIGHT PLAN 442 (fully automated control along the entire travel path).

The view 400 of the semi-automatic graphical user interface in accordance with the present embodiment is an exemplary view and other semi-automatic graphical user interfaces may be utilized. In accordance with the present embodiment, the semi-automatic graphical user interface would include one or more predetermined user input devices. Each user input device is provided for a simplified command, such as a limited action input device requiring only one or two actions to engage and/or simplified directional controls, in a low dexterity format for ease of finger inputs on the GUI 106 during, for example, movement of the portable control unit 104. The visual information, such as the graphical map view 402 and the video display 408 can be full or partial views and can be alternatively displayed or, as shown, displayed together. Alternatively, a simplified semi-automatic graphical user interface can also be provided with the graphical map view 402 and the video display 407 as selectable views which are displayed in response to a quick command from selection of a quick button input device (not shown).

Figure 5:
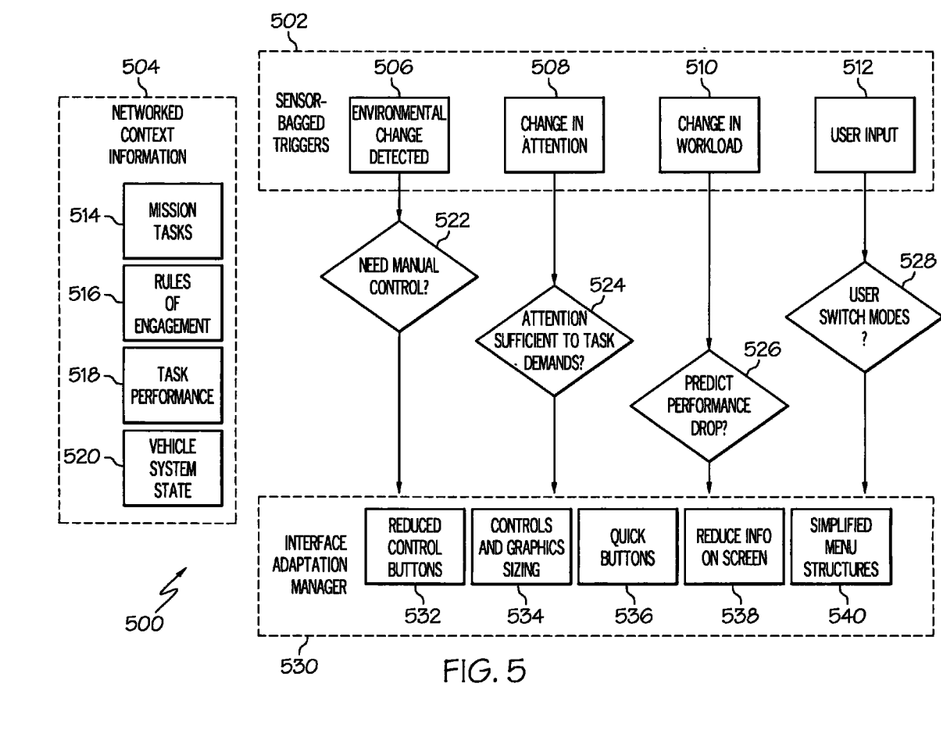
FIG. 5 is a depiction of an operation of a controller of the portable control device of FIG. 3 when switching from a manual operation mode to a semi-automatic operation mode in accordance with the present embodiment.

Referring to FIG. 5, a depiction 500 of an operation of the portable control unit controller 308 when switching from a manual operation mode to a semi-automatic operation mode in accordance with the present embodiment is depicted. In accordance with the present embodiment, the controller 308 monitors parameters of an operational environment of the portable control unit 104, such as parameters measuring the cognitive state of the user (e.g., the user workload signal from the workload measuring module 330) or the physical state of the user (e.g., the movement signal from the movement sensor 328). When certain sensor-based triggers 502 are received within a context of network context information 504, the controller 308 determines whether these contextual triggers (i.e., detected inputs and monitored parameters) encompass a measured and weighted combination of the detected inputs and the monitored parameters within the operational environment of the portable control unit 104 sufficient to switch from a manual operation mode to a semi-automatic operation mode.

Sensor based triggers 502 in accordance with the present embodiment may include environmental change detection 506, detection of a change in user attention 508, a change in user workload 510 or detection of a user input 512. Detection of these triggers by signals received by the controller 308 does not alone cause the controller 308 to switch operational modes. The controller 308 weighs the combination of triggers within the context of various network context information 504 indicating the operational environment of the surveillance system 100 such as mission tasks 514 preloaded to the portable control unit 104 and the unmanned vehicle 102, rules of engagement 516 defining the permissible actions for the unmanned vehicle 102, task performance 518 by the unmanned vehicle 102, and the vehicle system state 520 of the unmanned vehicle 102. The controller 308 can access this context information 504 as preloaded information in the portable control unit 104, information communicated by the unmanned vehicle 102 to the portable control unit 104, or information communicated to or retrieved by the portable control unit 104 from other sources.

In accordance with the present embodiment, the environmental sensor 328 may include a motion detector (e.g., an accelerometer) for detecting movement of the portable control unit 104, one or more noise sensors for detecting increases or decreases in noise around the portable control unit 104, sensors on the user's body to detect body positions (e.g., upright, kneeling or prone) and/or other such sensors to detect changes in the environment around the portable control unit 104. The portable control unit controller 308 can weigh the various environmental changes detected by the environmental sensor 328 and determine whether or not to switch the operational mode of the portable control unit 104 in response thereto.

Thus, in accordance with the present embodiment, the controller 308 switches from a manual or fully automated operation mode to a semi-automatic operation mode by making a contextual determination of (a) whether manual control is needed 522 when motion is detected 506, (b) whether a user's attention is sufficient to task demands 524 in response to detection of a user's drop in attention 508, (c) whether a drop in performance is predicted 526 in response to detection of a workload increase 510, or detection of a predetermined input 512 indicating that the user wishes to switch operational modes 528. Thus it can be seen that the present embodiment provides a framework for the controller to contextually trigger a switch from a manual operation mode to a semi-automatic operation mode in response to occurrence of predetermined criteria within the operational environment of the surveillance system 100 as determined by the controller 308. The user input 512 which authorizes the portable communication device 104 to switch operational modes could be a user input requesting switching of operational modes, a user semi-automatic mode approval input responding to a request for approval of operational mode switching generated by the controller 308 and presented to the user, or a user input adjusting the weighted combination to provide means for the controller 308 calculating an adjusted weighted combination.

The controller 308 may change the weighting factors or the combination formula over time in response to a learning algorithm or other contextually-derived learning formula. In this manner, the controller 308 can "learn" which user attention 508 and performance 510 require a switch in operational modes. In addition, the weighted combination may change over time by alterations to the weighting factors and/or the combination formula that are entered manually by the operator of the portable control device 104.

When switching to the semi-automatic operation mode, the controller 308 utilizes an interface adaptation manager 530 to declutter the GUI 106 by reducing the number of control buttons 532 to a number of predetermined user input devices, thereby presenting a reduced set of user interfaces on the GUI 106. The interface adaptation manager 530 also presents optimally sized controls and graphics 534 which includes graphic and visual displays 402, 407 and low dexterity sized input devices (e.g., fat finger buttons). And a number of limited action buttons (quick buttons) 536 are provided to facilitate control of the unmanned vehicle 102. In this manner, reduced information is provided 538 on the GUI 106 and the controller 308 provides a simplified menu structure 540 for simplified user control.

Thus it can be seen that a semi-automatic operation mode for the surveillance system 100 and a method and apparatus for automatically adapting user interfaces for the semi-automatic operation in response to occurrence of predetermined criteria within the operational environment of a surveillance system 100 has been provided. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for controlling a portable control device for an unmanned vehicle, the portable control device configured to selectively provide manual control of the unmanned vehicle in a manual operation mode or semi-automatic control of the unmanned vehicle in a semi-automatic operation mode, the method comprising the steps of:
monitoring parameters of an operational environment of the portable control device;
presenting, when in the manual operation mode, a manual operation graphical user interface to a user of the portable control device, wherein the manual operation graphical user interface comprises a first number of user interfaces for the manual operation mode presented by the portable control device;
automatically switching the portable control device, by the portable control device, from the manual operation mode to the semi-automatic operation mode in response to a measured and weighted combination of detected inputs and the monitored parameters within the operational environment; and
presenting, when in the semi-automatic operation mode, a semi-automatic operation graphical user interface to a user of the portable control device, wherein the semi-automatic operation graphical user interface comprises a second number of user interfaces for the semi-automatic operation mode presented by the portable control device, wherein the first number of user interfaces is greater than the second number of user interfaces.

2. The method in accordance with claim 1 wherein the step of monitoring parameters of the operational environment includes the step of determining one of movement of the portable control device, noise within the operational environment of the portable control device, user body position, user operation of the portable control device within a predetermined period of time, or entry of a user semi-automatic mode input.

3. The method in accordance with claim 1 wherein the step of presenting the semi-automatic operation graphical user interface comprises the step of presenting one or more user input devices to the user of the portable control device, wherein at least one of the one or more user input devices comprise one or more of low dexterity input devices.

4. The method in accordance with claim 3 wherein the step of presenting the one or more user input devices comprises the step of presenting the one or more user input devices to the user of the portable control device, wherein the one or more of low dexterity input devices comprise one or more quick button input devices performing an input command selected from a set of limited action input commands comprising move now, stop now, follow user, follow an identified object, go to an identified location, travel in an identified direction, search an identified object, and search within an identified radius.

5. The method in accordance with claim 1 further comprising the step of the user of the portable control unit adjusting the weighted combination to provide means for calculating an adjusted weighted combination, and wherein the step of switching to the semi-automatic operation mode comprises the step of switching from the manual operation mode to the semi-automatic operation mode in response to the adjusted weighted combination of the detected inputs and the monitored parameters detected and monitored within the operational environment.

6. The method in accordance with claim 1 further comprising the step of adjusting the weighted combination in response to a learning function learning from the monitored parameters over time to provide means for calculating an adjusted weighted combination, and wherein the step of switching to the semi-automatic operation mode comprises the step of switching from the manual operation mode to the semi-automatic operation mode in response to the adjusted weighted combination of the detected inputs and the monitored parameters detected and monitored within the operational environment.

7. The method in accordance with claim 1 wherein the step of presenting the semi-automatic operation graphical user interface comprises the step of presenting a graphical map view depicting at least a location of the unmanned vehicle, wherein the graphical map view is determined in response to the operational environment of the portable control device.

8. The method in accordance with claim 1 wherein the step of presenting the semi-automatic operation graphical user interface comprises the step of presenting a display of video feed view generated in response to visual signals received from the unmanned vehicle, the video feed view displayed determined in response to the operational environment of the portable control device.

9. A portable control device for an unmanned vehicle, the portable control device comprising:
a graphic user interface (GUI) for presenting information to a user of the portable control device and for receiving user inputs thereby; and
a controller coupled to the GUI and controlling the operational mode of the portable control device, wherein the controller is configured to:
monitor an operational environment of the portable control device;
automatically switch the portable control device from a manual operation mode to a semi-automatic operation mode in response to a measured and weighted combination of detected inputs and the monitored parameters within the operational environment of the portable control device;
provide GUI operational signals to the GUI for presenting a manual operation graphical user interface to the user while in the manual operation mode, wherein the manual operation graphical user interface comprises a first number of user interfaces for the manual operation mode presented by the portable control device; and
provide GUI operational signals to the GUI for presenting a semi-automatic operation graphical user interface to the user while in the semi-automatic operation mode, wherein the semi-automatic operation graphical user interface comprises a second number of user interfaces for the semi-automatic operation mode presented by the portable control device,
wherein the first number of user interfaces is greater than the second number of user interfaces.

10. The portable control device in accordance with claim 9 further comprising an environmental sensor for generating a signal in response to detecting environmental changes within the operational environment of the portable control device, wherein the controller is coupled to the environmental sensor to monitor the environmental changes as one of the predetermined criteria within the operational environment of the portable control device in response to the signal from the environmental sensor.

11. The portable control device in accordance with claim 10 wherein the environmental sensor generates the signal in response to detecting environmental changes within the operational environment, the environmental changes selected from the group of environmental changes comprising a change in noise level within the operational environment, movement of the portable control unit, and a change in a body position of an operator of the portable control unit.

12. The portable control device in accordance with claim 9 further comprising a workload measuring module which generates a user workload signal in response to detection of user operation of the portable control device within a predetermined period of time, wherein the controller is coupled to the workload measuring module to monitor user workload as one of the predetermined criteria within the operational environment of the portable control device.

13. The portable control device in accordance with claim 9 wherein the controller switches from the manual operation mode to the semi-automatic operation mode in response to a user semi-automatic mode input received from the GUI.

14. The portable control device in accordance with claim 13 wherein the controller presents a request for approval of mode switching to the user, the controller switching from the manual operation mode to the semi-automatic operation mode in response to a user semi-automatic mode approval input received from the GUI.

15. The portable control device in accordance with claim 9 wherein at least one of the reduced set of user interfaces for the semi-automatic operation graphical interface is a low dexterity input device.

16. The portable control device in accordance with claim 9, wherein at least one of the reduced set of user interfaces for the semi-automatic operation graphical interfaces is selected from a set of input devices comprising a low dexterity input device, a move now limited action input device, a stop now limited action input device, a follow user limited action input device, a follow an identified object limited action input device, a go to an identified location limited action input device, a travel in an identified direction limited action input device, a search an identified object limited action input device, and a search within an identified radius limited action input device.

17. The portable control device in accordance with claim 9 further comprising communication circuitry for receiving operational parameter signals from the unmanned vehicle, wherein the controller provides GUI operational signals to the GUI for presenting a graphical map view depicting at least a location of the unmanned vehicle as one of the reduced set of user interfaces for the semi-automatic operation graphical interface, wherein the graphical map view is determined in response to one of the operational parameter signals and the operational environment of the portable control device.

18. The portable control device in accordance with claim 9, further comprising communication circuitry for receiving visual signals from the unmanned vehicle, wherein at least one of the reduced set of user interfaces for the semi-automatic operation graphical interfaces is a video feed view from the unmanned vehicle, wherein the video feed view is determined in response to the visual signals and the operational environment of the portable control device.

19. A surveillance system comprising:
an unmanned vehicle comprising:
communication circuitry configured to receive operational control signals and transmitting operational parameter signals and visual signals;
a movement control module configured to control movement of the unmanned vehicle in response to movement control signals and to generate a first operational parameter signal in response to operation of the movement control module;
an unmanned vehicle controller coupled to the movement control module and the communication circuitry, wherein the unmanned vehicle controller is configured to generate the movement control signals in response to a first operational control signal; and
a visual recording module configured to record visual signals representative of one or more views from the unmanned vehicle in response to visual control signals and to generate a second operational control signal in response to operation of the visual recording module,
wherein the unmanned vehicle controller is coupled to the visual recording module and is configured to generate the visual control signals in response to the second operational control signal; and
a portable control device coupled to the unmanned vehicle configured to provide the operational control signals thereto and to receive the operational parameter signals and the visual signals therefrom, the portable control device comprising:
communication circuitry configured to receive the operational parameter signals and the visual signals from the unmanned vehicle and to transmit the operational control signals to the unmanned vehicle;
a graphic user interface (GUI) configured to present visual information to a user of the portable control device and to receive user inputs thereby; and
a portable control device controller coupled to the GUI and configured to control the operational mode of the portable control device, wherein the portable control device controller is configured to:
monitor an operational environment of the portable control device;
automatically switch the portable control device from a manual operation mode to a semi-automatic operation mode in response to measured and weighted combination of detected inputs and monitored parameters within the operational environment of the portable control device
provide GUI operational signals to the GUI for presenting a manual operation graphical user interface to the user while in the manual operation mode, wherein the manual operation graphical user interface comprises a first number of user interfaces for the manual operation mode presented by the portable control device; and
provide GUI operational signals to the GUI for presenting a semi-automatic operation graphical user interface to the user while in the semi-automatic operation mode, wherein the semi-automatic operation graphical user interface comprises a second number of user interfaces for the semi-automatic operation mode presented by the portable control device, wherein the first number of user interfaces is greater than the second number of user interfaces.

20. The surveillance system in accordance with claim 19 wherein the unmanned vehicle further comprises a Global Positioning System (GPS) receiver configured to generate location signals corresponding to a location of the unmanned vehicle and to provide the location signals to a surveillance vehicle controller, the surveillance vehicle controller configured to provide the location signals to the communication circuitry of the unmanned vehicle as a third operational parameter signal, and wherein the portable control device controller provides GUI operational signals to the GUI for presenting a graphical map view depicting at least the location of the unmanned vehicle as one of the reduced set of user interfaces for the semi-automatic operation graphical user interface, wherein the graphical map view is determined in response to the location signals received by the communication circuitry of the portable control device as one of the operational parameter signals and the operational environment of the portable control device.

* * * * *